Feb. 25, 1969 R. A. GANGE ETAL 3,430,075
HIGHLY STABLE PULSE GENERATOR
Filed Oct. 17, 1966
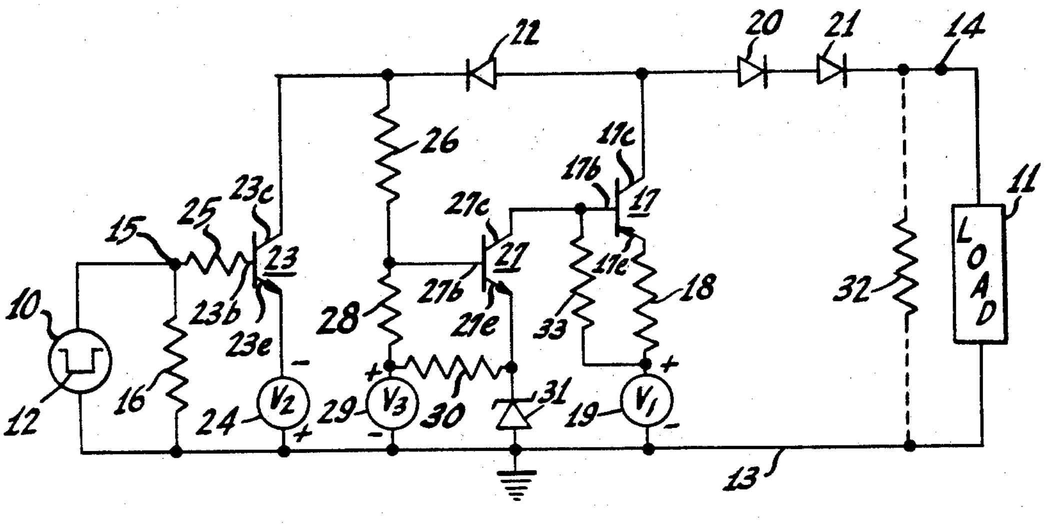
Inventors:
ROBERT A. GANGE &
JOHN F. THOMPSON
BY John V. Regan
Attorney United States Patent Office 3,430,075
Patented Feb. 25, 1969

3,430,075

HIGHLY STABLE PULSE GENERATOR

Robert A. Gange, Belle Mead, and John F. Thompson, Hopewell, N.J., assignors to Radio Corporation of America, a corporation of Delaware Filed Oct. 17, 1966, Ser. No. 587,076
U.S. Cl. 307—268 6 Claims
Int. Cl. H03k 3/02

This invention relates to signal generators and, in particular, to a versatile, stable and reliable pulse generator capable of providing fast rise and fall time pulses which are relatively free of amplitude variations and transient spikes.

Stability and reliability of signal generators which have the versatility to provide either current or voltage pulses are important factors in the choice of a generator for many applications. One problem associated with these factors is the relation between output current and load impedance variations. It is desirable that the output current be independent of load impedance variations. This is especially important, for example, when the load is a cryoelectric device wherein the resistance changes between zero and some finite value as the device changes between superconductive and normal states. Another problem related to stability and reliability is the maintenance of substantially constant amplitudes for successive voltage pulses. Constant amplitude voltage pulses, for example, are essential to obtaining reliable data for test evaluation purposes. A further problem is concerned with transient spikes occurring with the rise and fall of the output pulses. Transient spikes of sufficient amplitude and duration can cause erroneous data readings, especially where fast rise and fall times are required.

An object of the present invention is to provide a new and improved pulse generator.

Another object is to provide a versatile pulse generator capable of providing fast rise and fall time pulses which are relatively free of amplitude variations and transient spikes.

Briefly, the present invention is embodied as a pulse generator having a series switching circuit for connecting a source of energy with a load and a disconnect means for rapidly disconnecting the source from the load. According to the illustrated example of the invention, the switching means associated with the series circuit is a first transistor having the source and load connected in its emitter and collector circuits, respectively, such that turn on and turn off of the transistor corresponds, respectively, to the leading and trailing edges of the output pulses to the load. The disconnect means is enabled in response to control signals to disconnect the load from the series switching circuit prior to turn off of the transistor in such manner as to provide a separate path for the collector current thereof while at the same time preventing any substantial current drain from the load, thereby substantially eliminating transient spikes at the trailing edge of the output pulse. The disconnect means also includes means for isolating the turn on transients of the first transistor from the load.

Referring now to the sole figure of the drawing, the pulse generator of the present invention provides output pulses to a load 11 in response to a control signal source 10. The load 11 is connected between the generator output terminal 14 and a reference conductor 13. The reference conductor 13 is connected to a suitable fixed reference potential such as circuit ground as illustrated by the conventional symbol in the drawing.

The control signal source 10 which may be any suitable source capable of providing pulses of the type illustrated by pulses 12, has one terminal connected to the reference conductor 13. The other terminal of the source 10 is connected to an input terminal 15 of the pulse generator. For the case where the source 10 is coupled to the input terminal 15 and the reference conductor 13 by way of a transmission line, such as a coaxial cable, a terminating resistor 16 of appropriate value may be connected by input terminal 15 and reference conductor 13 as illustrated in the drawing.

The basic pulsing circuit for the illustrated pulse generator is a series switching circuit which includes load 11, output terminal 14, a first PNP transistor 17, an emitter resistor 18 and a source of direct current potential 19. Also included in this series switching circuit are diodes 20 and 21 which form part of the disconnect means of the present invention as will hereinafter become apparent. The transistor 17, which is operable as a switch having on and off states, has its emitter electrode **17*e* connected by way of emitter resistor 18 to the positive terminal of the source 19, the negative terminal of which is connected to circuit ground. The collector electrode 17*c* is connected by way of the diodes 20 and 21 to the output terminal 14**.

In addition to diodes 20 and 21, the disconnect means includes diode 22, a second NPN transistor 23 and a source of D.C. voltage 24. Diode 22 is connected between the collector electrodes **17*c* and 23*c* for forward current conduction in the same direction as the normal collector current flow for each of the transistors 17 and 23. The emitter electrode 23*e* is connected to the negative terminal of source 24, the positive terminal of which is connected to reference conductor 13. The base electrode 23*b* is connected by way of base resistor 25 to the input terminal 15**.

Collector resistor 26 couples collector electrode **23*c* to base electrode 27*b* of a third NPN transistor 27. Also connected to base electrode 27*b* by way of a resistor 28 is the positive terminal of a further source 29 of D.C. voltage, the negative terminal of which is connected to reference conductor 13. The positive terminal of source 29 is further connected by way of a Zener bias resistor 30 to the emitter electrode 27*e*. Zener bias resistor 30 and emitter electrode 27*e* are also connected to the cathode of Zener diode 31, the anode of which is connected to reference conductor 13. To complete the circuit for transistor 27, collector electrode 27*c* is connected to base electrode 17*b* of transistor 17, and to resistor 33, the other end of which returns to the positive terminal of source 19. Resistor 33 aids in the turn off of transistor 17 by completing a path for the reverse current flow through the base-emitter junction of transistor 17 during the trailing edge of input pulse 10**.

The D.C. voltage sources 19, 24 and 29 may be any suitable type of D.C. voltage supplies, for example, batteries, and are assumed to have values, respectively, of V1, V2, and V3 volts in the description which follows. The control pulses 12 are assumed to have high and low values which are more positive and negative, respectively, than —V2 volts. Thus, when the value of the source 10 is high (absence of a control pulse), transistor 23 is turned on; and when the value of source 10 is low (presence of a control pulse), transistor 23 is turned off.

Consider first, the on condition of transistor 23 which corresponds to the absence of a control pulse. For this condition transistor 23 acts as a switch to translate substantially —V2 volts to the cathode of diode 22. Resistors 26 and 28 cooperate as a voltage divider with sources 24 and 29 to bias transistor 27 in an off condition such that substantially no base current is available for transistor 17 in the series switching circuit. Thus, transistor 17 is turned off whereby substantially no current is applied to load 11.

With the negative voltage of —V2 volts at the cathode of diode 22, the diode is biased in a low forward impedance condition to clamp the collector electrode 17c to substantially —V2 volts. The forward biased diode 22 and resistor 26 provide a path for the leakage currents of transistors 17 and 27. Disconnect diode 20 is reverse biased at —V2 volts, and is selected to have a relatively high reverse breakdown characteristic. Diodes of this type typically draw a reverse current on the order of a fraction of a microampere so that there is substantially no current drain from the load 11. Hence, in the absence of a control pulse 12, there is substantially zero current flow in load 11.

When the leading edge of a control pulse 12 occurs, transistor 23 turns off. The voltages at collector electrode 23c and base electrode 27b begin to rise toward +V3 volts tending to turn transistor 27 on and to bias diode 22 in a high forward impedance condition. The values of resistors 26, 28 and 30, and the Zener diode 31 are selected such that diode 22 becomes biased in a high forward impedance condition prior to transistor 27 turning on. At this instant, the leakage current of transistors 27 and 17 flow in the forward direction through diodes 20 and 21 and load 11. When transistor 27 turns on, the fixed voltage provided by Zener diode 31 at emitter electrode 27e is coupled via the collector-emitter path of the transistor to the base electrode 17b of transistor 17. This Zener voltage is less positive than +V1 volts whereby transistor 17 turns on.

It should be noted at this point that as transistor 17 is turning on the voltage at its base electrode 17b changes from a value of substantially +V1 volts to the less positive Zener voltage resulting in a negative going transition. This negative going transistion is coupled by way of the base collector junction capacitance to the collector electrode 17c. Diode 21 is selected to have a very fast reverse recovery characteristic, that is, a short minority carrier storage depletion time and a small junction capacitance, such that the reverse current flow therethrough is substantially nil. Typically, diode 21 may be an S570G type. Hence, fast reverse recovery diode 21 effectively isolates the negative going transition from the load 11.

When transistor 17 turns on, diodes 20 and 21 become biased in low forward impedance conditions such that the transistor collector current increases rapidly and flows through the diodes and to the load. After the turn on transient, this collector current is substantially constant since it is solely a function of the parameter $\alpha$ of transistor 17, and the emitter current of transistor 17. The emitter current itself is constant due to the fixed Zener voltage at base electrode 17b and the D.C. voltage source 19. Specifically, the emitter current is substantially equal to V1 volts minus the Zener voltage divided by resistor 18 (assuming the base-emitter voltage drop of transistor 17 and the collector-emitter voltage of the saturated transistor 27 are negligible). Thus, the collector current of transistor 17 and likewise the current flow in load 11 is substantially constant and independent of load impedance variations.

When the trailing edge of a control pulse 12 occurs, transistor 23 turns on. The voltage at collector electrode 23c begins to fall toward —V2 volts tending to bias diode 22 in a low forward impedance condition. The voltage which appears at the base electrode 27b defined by resistors 26 and 28, and the —V2 and +V3 voltages tends to turn transistor 27 off. The values of resistors 26, 28 and 30 and the Zener diode are such that diode 22 becomes biased in the low forward impedance condition prior to transistor 27 turning off. When diode 22 becomes biased in the low forward impedance condition, the collector current of transistor 17 begins to flow out of the load 11, and into the shunt path of diode 22, the collector-emitter path of transistor 23 and source 24 to circuit ground. The collector electrode 17c becomes clamped to a negative voltage such that disconnect diodes 20 and 21 becomes reversed biased. Due to the fast reverse recovery characteristic of diode 21, there is substantially no current drain from the load 11 and transient spikes are substantially absent as the load current decreases rapidly to 0 amperes. As the voltage at base electrode 27b continues to decrease, transistor 27 turns off. With transistor 27 turned off, the base current of transistor 17 decreases; and reverse current flows through the base-emitter junction of transistor 17 and resistors 33 and 18 so that transistor 17 also turns off.

Successive control signals 12 cause the pulse generator arrangement to operate in a repetitive manner to provide successive output control pulses to the load 11.

In summary, the disconnect means includes diode 20 which has a high reverse breakdown characteristic and low leakage. During the absence of a control pulse 12, these characteristics of diode 20 prevent current drain from load 11 and there is substantially zero load current for this condition. The fast reverse recovery characteristic of diode 21 isolates the turn on transients of series switching transistor 17 from the load 11. The disconnect means also includes a shunt path for the collector current of transistor 17. This shunt path includes diode 22, transistor 23 and D.C. source 24. Transistor 23 and diode 22 respond to the trailing edge of a control pulse 12 to disconnect the collector current of transistor 17 from the load 11 prior to turn off of transistor 17. The disconnect means provided by diode 22, transistor 23, and D.C. source 24 prevents a positive transient of current from appearing in the load due to a positive potential change at base electrode 17b. When diode 22 becomes biased in the low forward impedance condition it absorbs this current which momentarily flows through the depletion layer base-collector capacitance of transistor 17, thereby substantially eliminating any transient spikes in the trailing edge of the load current pulses. Thus, when transistor 17 does finally turn off, the turn off transients are absorbed in the shunt path of diode 22 and transistor 23.

There has been described thus far a pulse generator which is operative to provide substantially constant current pulses to a load 11 in response to control pulses 12. The subject pulse generator is versatile in that it can be readily modified to provide voltage pulses to load 11 rather than current pulses. This can be done, for example, by connecting a resistor 32 between the output terminal 14 and the reference conductor 13 of the generator. In addition, it should be noted that the amplitude of the output current or voltage pulses can be set to any value within the operating range of transistor 17 by varying the value V1 of source 19 or the value of emitter resistor 18.

Although the invention has been described with transistors 23 and 27 illustrated as being of the NPN conductivity type and transistor 17 of the PNP conductivity type, it should be apparent that transistor 17 may be of the NPN type and transistors 23 and 27 of the PNP type provided that the various diode and D.C. voltage source polarities are changed accordingly.

What is claimed is:

1. A pulse generator arrangement for providing highly stable pulses to a load in response to a source of control signals, said arrangement comprising:

a series switching circuit including the collector-emitter path of a first transistor for connecting a source of energy to said load, disconnect means responsive to said control signals to substantially isolate the turn on and turn off transients of said first transistor from said load, said disconnect means including:

control signal responsive switching means for providing a shunt path for collector current of said first transistor prior to turn off of said first transistor, means for preventing any substantial current drain from said load to said shunt path and for isolating said load from said first transistor during turn on thereof, and circuit means responsive to said switching means for turning said first transistor on and off.

2. The invention according to claim 1:
wherein said switching means includes the collector-emitter path of a second transistor and first diode means connected in said shunt path, and
wherein the conductivity of said transistor is controlled by said control signals.

3. The invention according to claim 2:
wherein said circuit means includes a third transistor responsive to said second transistor turning off and on to turn said first transistor on and off, respectively.

4. The invention according to claim 3:
wherein said means for preventing includes second diode means having fast recovery, low leakage, and high reverse breakdown characteristics.

5. The invention according to claim 4:
wherein said second transistor is turned off and said first diode means is biased in a high forward impedance condition in response to the leading edges of said control signals,
wherein said second transistor is turned on and said first diode means is biased in a low forward impedance condition in response to the trailing edges of said control signals, and
wherein said third transistor turns said first transistor off after said first diode means becomes biased in the low forward impedance condition.

6. The invention according to claim 1:
wherein said first transistor has a base electrode, and wherein said circuit means includes means for providing a fixed potential to said first transistor base electrode when said first transistor is turned on.

References Cited

UNITED STATES PATENTS

| | | | |
|---|---|---|---|
| 3,194,972 | 7/1965 | Buchmeyer | 307—255 |
| 3,275,854 | 9/1966 | Cianciola | 307—263 XR |
| 3,290,519 | 12/1966 | Ross | 307—255 XR |
| 3,305,726 | 2/1967 | Goodman et al. | 307—253 XR |

JOHN S. HEYMAN, *Primary Examiner.*

JOHN ZAZWORSKY, *Assistant Examiner.*

U.S. Cl. X.R.

307—255, 270, 237